US009634866B2

(12) United States Patent
Anders et al.

(10) Patent No.: US 9,634,866 B2
(45) Date of Patent: Apr. 25, 2017

(54) ARCHITECTURE AND METHOD FOR HYBRID CIRCUIT-SWITCHED AND PACKET-SWITCHED ROUTER

(71) Applicants: Mark A Anders, Hillsboro, OR (US); Gregory K Chen, Hillsboro, OR (US); Himanshu Kaul, Portland, OR (US); Ram K Krishnamurthy, Portland, OH (US); Shekhar Y Bokar, Beaverton, OR (US)

(72) Inventors: Mark A Anders, Hillsboro, OR (US); Gregory K Chen, Hillsboro, OR (US); Himanshu Kaul, Portland, OR (US); Ram K Krishnamurthy, Portland, OH (US); Shekhar Y Bokar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 14/129,544

(22) PCT Filed: Sep. 6, 2013

(86) PCT No.: PCT/US2013/058630
§ 371 (c)(1),
(2) Date: Dec. 26, 2013

(87) PCT Pub. No.: WO2015/034525
PCT Pub. Date: Mar. 12, 2015

(65) Prior Publication Data

US 2015/0071282 A1 Mar. 12, 2015

(51) Int. Cl.
*H04L 12/64* (2006.01)
*H04L 12/933* (2013.01)

(52) U.S. Cl.
CPC ........ *H04L 12/6418* (2013.01); *H04L 49/109* (2013.01)

(58) Field of Classification Search
CPC .......................... H04L 12/6418; H04L 49/109
(Continued)

(56) References Cited

U.S. PATENT DOCUMENTS 8,284,766 B2 10/2012 Anders et al.
2004/0042450 A1 3/2004 Monroe et al.
(Continued)

FOREIGN PATENT DOCUMENTS

EP 1191753 A2 * 3/2002 ......... H04L 12/5692

OTHER PUBLICATIONS

International Preliminary Report on Patentability PCT Application No. PCT/US2013/058630 mailed Mar. 17, 2016, 8 pages.
(Continued)

*Primary Examiner* — Andrew Chriss
*Assistant Examiner* — Ellen Kirillova
(74) *Attorney, Agent, or Firm* — Blakely, Sokoloff, Taylor & Zafman LLP

(57) ABSTRACT

Techniques and mechanisms for performing circuit-switched routing and packet-switched routing for network communication. In an embodiment, a router evaluates control information of a packet received by the router, the evaluation to detect whether the packet includes data for a sideband communication. Based on the evaluation, the router performs a selection from among a plurality of modes of the router, the plurality of modes including a first mode to route the packet for packet-switched communication of sideband data in a network. The plurality of modes also includes a second mode to configure a circuit-switched channel according to the packet. In another embodiment, the router determines a direction for routing a packet in a
(Continued)

hierarchical network, wherein the determining of the direction is based on a level of the router in a hierarchy of the hierarchical network.

22 Claims, 9 Drawing Sheets

(58) Field of Classification Search
USPC .......................................................... 370/353
See application file for complete search history.

(56) References Cited

U.S. PATENT DOCUMENTS

| | | | | |
|---|---|---|---|---|
| 2005/0249241 | A1 | 11/2005 | Farnsworth et al. | |
| 2006/0117367 | A1* | 6/2006 | Lyle | H04L 12/18 725/114 |
| 2006/0159049 | A1* | 7/2006 | Chung | H04L 29/12216 370/331 |
| 2009/0117884 | A1 | 5/2009 | Mosker | |
| 2009/0138867 | A1 | 5/2009 | Bambach et al. | |
| 2013/0138858 | A1* | 5/2013 | Adler | G06F 13/366 710/305 |
| 2013/0142066 | A1* | 6/2013 | Yamaguchi | H04L 49/109 370/252 |

OTHER PUBLICATIONS

"PCT, International Search Report and Written Opinion of the International Searching Authority for International Application No. PCT/US2013/058630", (Mar. 31, 2014), Whole Document.
"U.S. Appl. No. 14/126,910, entitled "A Method, Apparatus and System for a Source-Synchronous Circuit-Switched Network on a Chip (NOC)", filed Jun. 28, 2013", (Jun. 28, 2013), Whole Document.
Anders, et al., "A 2.9Tb/s 8W 64-Core Circuit-8witched Network-on-Chip in 45nm CMOS, 2008 IEEE", (2008), pp. 182-185.
Anders, et al., "A 2.9Tb/s Bisection-Bandwidth 560Gb/s/W Streaming Circuit-Switched 8×8 Mesh Network0on-Chip in 45nm CMOS, ISSCC 2010/Session 5/Processors/ 5.8, 2010 IEEE International Solid-State Circuits Conference", (2010), pp. 22-24.

* cited by examiner

ARCHITECTURE AND METHOD FOR HYBRID CIRCUIT-SWITCHED AND PACKET-SWITCHED ROUTER

CLAIM OF PRIORITY

This application is a U.S. National Phase application under 35 U.S.C. §371 of International Application No. PCT/US2013/058630, filed Sep. 6, 2013, entitled "ARCHITECTURE AND METHOD FOR HYBRID CIRCUIT-SWITCHED AND PACKET-SWITCHED ROUTER," the entire contents of which are incorporated herein by reference.

BACKGROUND

1. Technical Field

This disclosure pertains to computing systems, and in particular (but not exclusively) to communications of a network-on-chip.

2. Background Art

As integration densities continue to increase in power limited computing environments, multi-core processors provide increased performance vs. power efficiency through parallel processing at reduced voltages and frequencies. Interconnect networks, such as those for on-die communication between cores, are key to enabling scalable performance as the number of cores increases. Circuit-switched networks offer a dedicated channel during data transmission without the need for intermediate buffering or arbitration. This can offer lower power consumption—at least by allowing a reduction of data storage clock power—and higher throughput, as compared with packet-switched networks. Consequently, packet-switched networks can achieve higher resource utilization especially for smaller bit-width messages.

However, by avoiding buffering and arbitration, the dedicated channel resources must be reserved prior to data transmission, possibly preventing other more optimal data transmissions from occurring. Unlike pre-scheduled source-directed routing schemes, distributed routing schemes are not limited to predefined traffic patterns or applications, but determine packet routes and priorities for the reservation of resources based on incomplete real-time information.

Furthermore, network topologies such as mesh and hierarchical tree (also referred to as hierarchical star) offer different trade-offs in overall power vs. bandwidth. A mesh network favors a uniform traffic distribution with more gradual performance penalties as distances increase. A hierarchical star topology provides for relatively improved performance for more local traffic by reducing the overall router hop count. The varying requirements of future integrated network-on-chip (NoC) applications suggest a heterogeneous approach, with multiple on-die networks of different topologies and efficiency tradeoffs.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms for both circuit-switched routing of information and packet-switched routing of information in a network. In an embodiment, a router includes resources configured to receive at least a portion of a packet via a packet-switched network. Based on such packet-switched information, the router may operate in a mode to configure at least part of a circuit-switched path for other data to be exchanged with the router between a source node of a network and a destination node of the network. Alternatively, the router may operate in a different mode based on information in a received packet to instead route the packet to communicate data in a packet-switched sideband channel of the network—e.g. without also configuring at least part of a circuit-switched path based on the packet information. Such a sideband channel may, for example, be concurrent with circuit-switched communications by the router. In an embodiment, any configuring of a circuit-switched path of the network may be independent of data communicated in the sideband channel.

Figure 1:
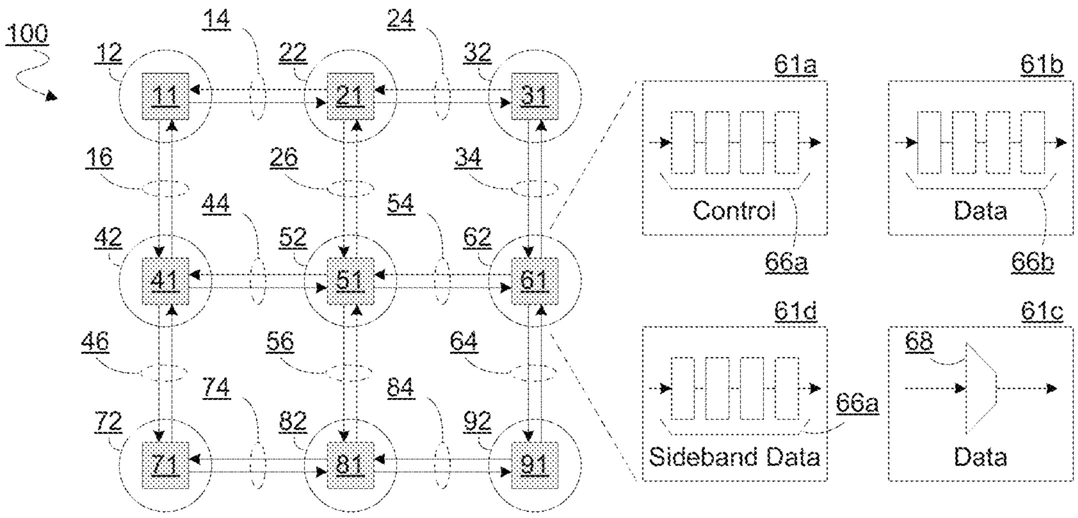
FIG. 1 is a layout diagram illustrating elements of a mesh network to perform routing according to an embodiment.

FIG. 1 shows a die including a plurality of cores including circuit logic to operate as either of a packet-switched network and a circuit-switched network to provide intra-die communication in accordance with an example arrangement. Other arrangements may also be used according to different embodiments.

More specifically, FIG. 1 shows a die 100 that includes a plurality of cores 12, 22, 32, 42, 52, 62, 72, 82, 92 including or coupled to respective routers 11, 21, 31, 41, 51, 61, 71, 81, 91. The die 100 is therefore considered to be a multi-core die. The die 100 shows the multi-cores organized or arranged as a grid, although the cores may be organized or arranged differently. The cores may be provided in a network or communicate in a network, such as a packet-switched network and/or a circuit-switched network, of the die 100.

The routers 11, 21, 31, 41, 51, 61, 71, 81, 91 may be coupled together by interconnects 14, 16, 24, 26, 34, 44, 46, 54, 56, 64, 74 and 84 for communication between cores 12, 22, 32, 42, 52, 62, 72, 82 and 92. More specifically, router 11 may be coupled to router 21 by interconnect 14, and router 11 may be coupled to router 41 by interconnect 16. Router 21 may be coupled to router 31 by interconnect 24, and router 21 may be couple to router 51 by interconnect 26. Still further, router 31 may be coupled to router 61 by interconnect 34. Router 41 may be coupled to router 51 by interconnect 44, and router 41 may be coupled to router 71 by interconnect 46. Router 51 may be coupled to router 61 by interconnect 54, and router 51 may be coupled to router 81 by interconnect 56. Still further, router 61 may be coupled to router 91 by interconnect 64. Router 71 may also be coupled to router 81 by interconnect 74, and router 81 may be coupled to router 91 by interconnect 84.

In FIG. 1, packets may be communicated among the various routers using resources of the packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the cores of the die. The packet switched network may include buffering because a dedicated path is not assured from a source to a destination and so a packet may need to be stopped temporarily if two or more packets need to traverse a same link or interconnect.

In a packet switched network, the packets may be buffered at each of the respective routers as the packet travels from a source to a destination. The packets may be received, transmitted and processed each in a router of (or associated with) a respective core. For example, FIG. 1 shows two components of the router 61 for core 62, namely a control portion component 61*a* and a data portion component 61*b*. Although, the components 61*a* and 61*b* are shown as separate elements of the router, the components 61*a* and 61*b* may be provided as one component.

The control portion component 61*a* may include a plurality of flip-flops 66*a* coupled in series to buffer the control portion of a packet as the packet passes through the router of the core. The first one of the flip-flops 66*a* may receive the control portion of the packet from another router located at another core, and the last one of the flip-flops 66*a* of one router may provide the control portion of the packet to another router (on another core).

The data portion component 61*b* may include a plurality of flip-flops 66*b* coupled in series to buffer the data portion of a packet as the packet passes through the router. The first one of the flip-flops 66*b* may receive the data portion of the packet from another router located at another core, and the last one of the flip-flops 66*b* of the router may provide the data portion of the packet to another router (on another one of the cores).

The packet switched network may buffer packets at each of the routers using the flip-flops 66*a* and 66*b* in the components 61*a* and 61*b*. The packet switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock. While packet switching offers flexibility in routing, packet switching may suffer from large power consumption associated with a necessity to buffer packets at each router.

In an embodiment, routers of die 100 may be variously provided in two networks or communicate in two networks, such as a packet switched network and a circuit switched network. In FIG. 1, packets may be variously communicated among the various routers 11, 21, 31, 41, 51, 61, 71, 81, 91 using resources of the packet switched network and using resources of the circuit switched network.

FIG. 1 further shows a data portion component 61*c* of router 61 for circuit-switched routing of data. Although FIG. 1 shows components 61*a*, 61*c* as separate elements of router 61, components 61*a*, 61*c* may be provided as one component, in an embodiment. The data portion component 61*c* may include a multiplexer 68 to receive the data portion of packets from neighboring cores (e.g. from their associated routers), and to provide the data portion to another neighboring core (router). As such, the data portion component 61*c* may not utilize the flip-flops 66*b* (from the packet switch network). The circuit switched network may therefore avoid buffering data packets at each of the cores. Both the packet switched network and the circuit switched network may use multiplexers.

For example, a control portion of a packet may be sent from a router of (or for) for a source core to a router of (or for) a destination core without simultaneously sending the corresponding data portion of the packet. The sending of the control portion of a packet may utilize resources of the packet switched network. Upon the control portion being received at the destination core's router, an acknowledgement signal (or message) may be sent from that router to the source core's router by utilizing resources of the circuit switched network. The source core may then send the data portion of the packet from the source core to the destination core by utilizing resources of the circuit switched network.

Because die 100 utilizes resources of two networks, different clock speeds may be used, which leads to less power consumption. For example, control portions of the packets may be transferred between cores of the die 100 based on a packet clock, such as a 4 GHz clock, which corresponds to a packet switch clock. The data portion of the packets may be transferred between cores of the die 100 based on a different and slower clock, such as a 1 GHz clock, which corresponds to a circuit switch clock.

As each control portion (or request) passes each router/interconnect segment, the corresponding data channel for that segment (i.e., the corresponding interconnect) may be allocated for the upcoming data portion of the packet. Therefore, when the control portion reaches the destination core's router, a complete channel or circuit may have been established for the upcoming data portion of the packet. This channel may utilize a latching or storage element only at the destination core (or its associated router) with respective multiplexers and/or repeaters (not shown explicitly) at each router along the way.

The destination core (and/or its associated router), upon receiving the control portion, may send a single acknowledgement signal (or message) back to the source, thereby indicating that the destination is ready to receive the data. When the source receives this acknowledgement signal, the source may drive the data onto its output. The data may propagate from the source node to the destination node without interruption by state elements along the path.

FIG. 1 further shows a sideband data portion component 61*d* of router 61 for packet-switched routing of other data (referred to herein as sideband data) which is concurrent with or otherwise in addition to an exchange of data via portion 61*c*. In certain embodiments, an exchange of sideband data via portion 61*d* may alternatively be concurrent with an exchange of data via portion 61*b*. Although FIG. 1 shows components 61*a*, 61*d* as separate elements of router 61, components 61*a*, 61*d* may be provided as one component, in an embodiment.

The sideband data portion component 61*d* may include a plurality of flip-flops 66*d* coupled in series to buffer a packet including a control portion and a data portion as the packet passes through the router of the core. The first one of the flip-flops 66*d* may receive the packet from another router located at or in another core, and the last one of the flip-flops 66*d* of one router may provide the packet to another router (on another core). The packet switched network may buffer packets at each of the routers using the flip-flops 66*d* in component 61*d*. The packet switched network may use point-to-point communication between neighboring routers for exchanging sideband data.

In order to transmit a single data packet, the circuit switched network may allocate an entire path, whereas the packet switched network may allocate only a single segment (or interconnect). This results in difference in throughput. To compensate for this difference in throughput, a data bit width of the circuit switched network may be increased to result in equal throughput.

Figure 2:
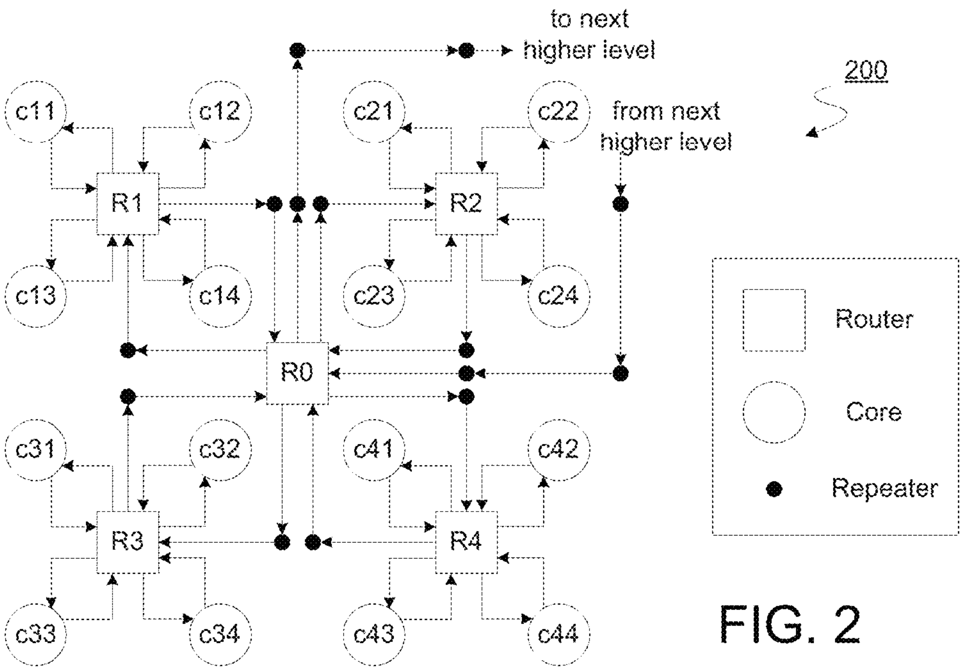
FIG. 2 is a layout diagram illustrating elements of a hierarchical network to perform routing according to an embodiment.

FIG. 2 illustrates elements of a die according to an embodiment which includes an alternative topology to the mesh topology of die 100. More specifically, FIG. 2 shows a die 200 that includes a hierarchical (also referred to as a hierarchical tree or hierarchical star) topology. By way of illustration and not limitation, die 200 may include a router R0 to variously route packets down the network hierarchy to (and/or up the network hierarchy from) some plurality of network nodes. Such a plurality of network nodes may include any of various combinations of one or more cores and/or routers, as represented by the illustrative routers R1, R2, R3, R4.

Router R1 may be configured to variously route packets down the network hierarchy to (and/or up the network hierarchy from) cores c11, c12, c13, c14 of die 200. Router R2 may be configured to variously route packets down the network hierarchy to (and/or up the network hierarchy from) cores c21, c22, c23, c24 of die 200. Router R3 may be configured to variously route packets down the network hierarchy to (and/or up the network hierarchy from) cores c31, c32, c33, c34 of die 200. Router R4 may be configured to variously route packets down the network hierarchy to (and/or up the network hierarchy from) cores c41, c42, c43, c44 of die 200. Die 200 illustrates an example of a degree four (4) hierarchy wherein nodes (e.g. routers) each couple to a total of four respective adjacent nodes lower in the hierarchy. This may be implemented with 5-port routers which are each to further couple to a respective adjacent node which is higher in the hierarchy. However, additional or alternative degrees of hierarchy may be provided in die 200, according to different embodiments.

Similar to die 100, the cores and routers of die 200 may be provided in a network or communicate in a network, such as a packet-switched network and/or a circuit-switched network, of the die 200. For example, some or all of the routers R0, R1, R2, R3, R4 may each include respective circuitry to provide the functionality of components 61*a*, 61*b*, 61*c*, 61*d*.

Although networked as a hierarchy, the routers and cores of die 200 may be arranged relative to one another in a grid-like pattern such as that shown in FIG. 2. For example, each lowest level router in the hierarchy may be located in the middle of adjacent cores. Alternatively or in addition, a router in a hierarchical level n+1 may be placed in the middle of adjacent nodes in a next lower hierarchy level n. This implementation reduces total wire length and creates a regular routing pattern. Such an arrangement provides efficient routing for comparatively localized traffic patterns, e.g. by facilitating routes having relatively smaller hop counts between cores/routers. For example, the hop count in a degree four hierarchy scales on an order of (log 4N), where N is the number of cores in the network. Such hop count scaling, which is smaller than the scaling order of (sqrt N) for a mesh network, becomes considerable for many-core networks with large N. However, at higher levels of hierarchy, interconnect length between hierarchical levels may increase. To accommodate increased delay from traversing longer channels, sequential repeaters may be included in die 200—e.g. at intervals equal to the length of the lowest level channels—e.g. any of the channels variously coupling router R1 to C11, C12, C13, C14.

Figure 10:
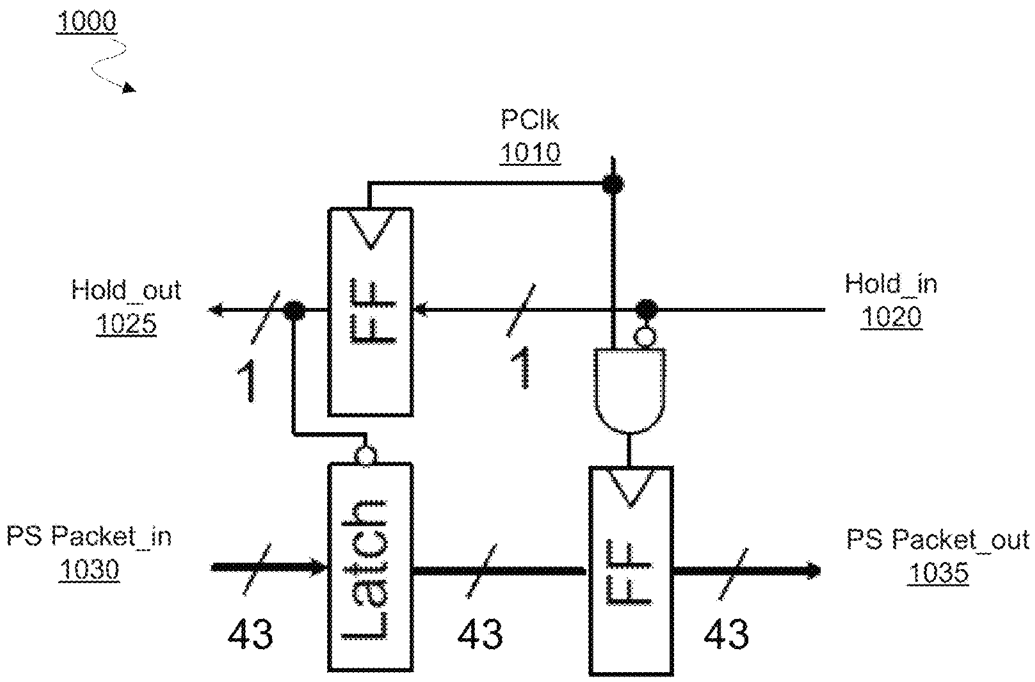
FIG. 10 is a block diagram illustrating elements of a repeater circuit for operation in a hierarchical network according to an embodiment.

FIG. 10 illustrates elements of one such repeater 1000 according to an illustrative embodiment. In repeater 1000, an input port PS Packet_in 1030 is coupled to an output port PS Packet_out 1035 via latch and flip-flop logic—e.g. where operation of such latch and flip-flop logic is controlled by a control signal input Hold_in 1020, a control signal output Hold_out 1025 and a packet clock signal PClk 1010. Packets received via PS Packet_in 1030 may only be output to PS Packet_out 1035, in an embodiment. In the illustrative repeater 1000, Packet_in 1030 may include forty-three (43) signal lines for such a packet—e.g. including eleven (11) address and/or control signal lines and signal lines for 32 bits to accommodate any sideband data (where a data packet is for communication of such sideband data).

Figure 3B:
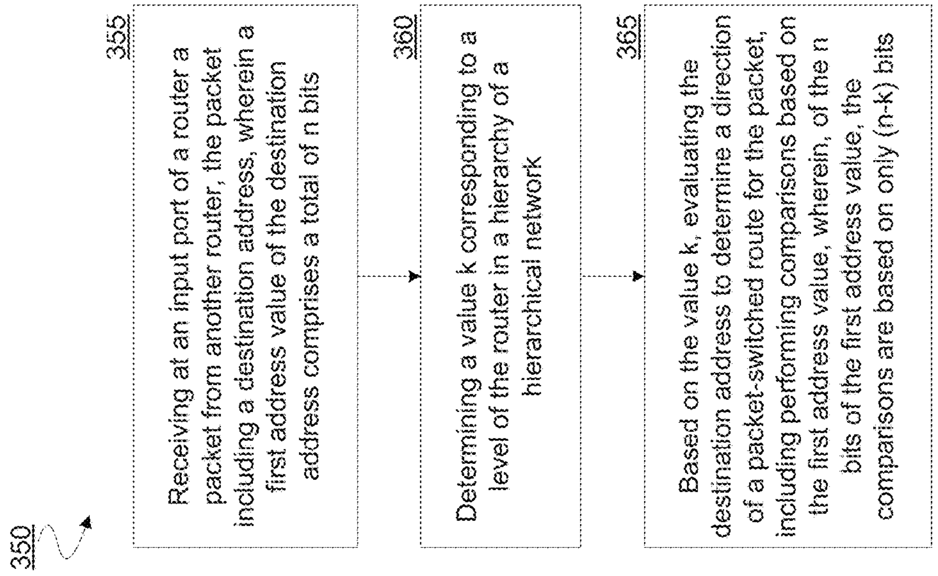
FIG. 3B is a flow diagram illustrating elements of a method for routing packet data according to an embodiment.
Figure 3A:
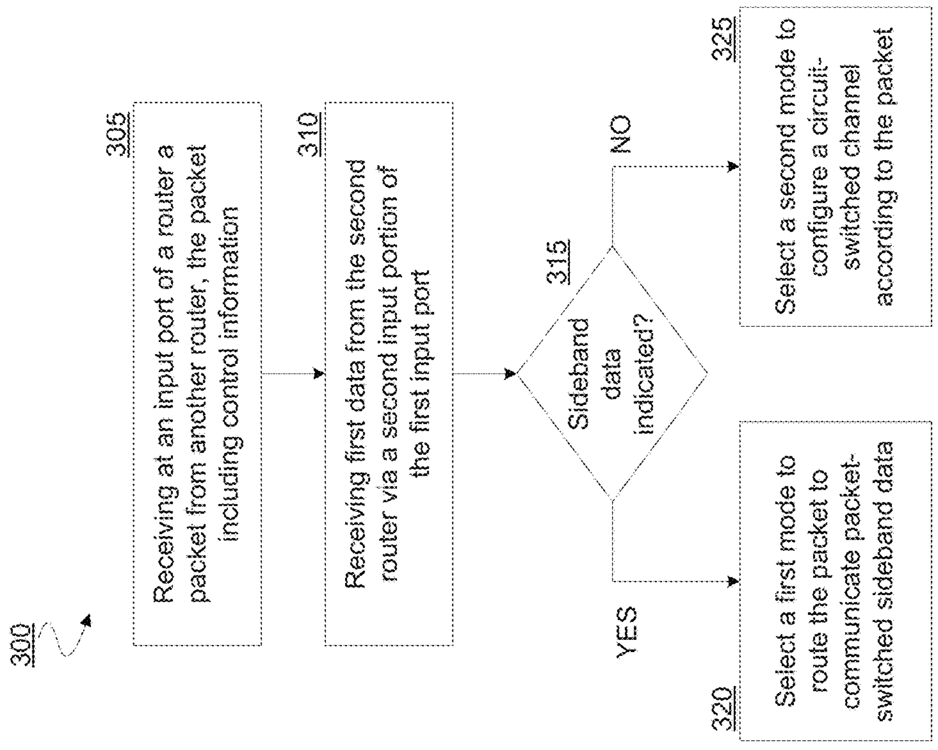
FIG. 3A is a flow diagram illustrating elements of a method for operating a router according to an embodiment.

FIG. 3A illustrates elements of a method 300 for providing network communication according to an embodiment. Method 300 may be performed for communications in a network including some or all of the features of the mesh network of die 100 and/or of the hierarchical network of die 200. For example, some or all operations of method 300 may be performed by a network node having functionality such as that of router 61.

Method 300 may include, at 305, receiving a packet at an input port of a router, the packet including control information. In an embodiment, the packet is received from the other router via a first input portion of the input port. The control information of the packet may include, for example, a sideband enable signal (value) to specify whether the packet includes data for sideband communication. Such sideband data is to be distinguished from control information which, for example, may be exchanged to control the configuration of a circuit-switched network path. Alternatively or in addition, the control information of the packet may include a valid signal (value) to indicate to the first input portion the presence of a valid packet.

Method 300 may further comprise, at 310, receiving first data from the second router via a second input portion of the input port. In an embodiment, the first input portion and the second input portion of the input port are, respectively, to variously receive packet-switched information (e.g. packets) and to variously receive circuit-switched data. Depending on an operational mode of the router, packet-switched information received via the first input portion may provide a basis for configuring circuit-switched routing by the router, or may instead be packet-switch routed from the router to communicate sideband data.

For example, method 300 may comprise, at 315, performing an evaluation of the control information of the packet—e.g. to detect whether a presence of sideband data is indicated. In an embodiment, the evaluation at 315 includes evaluation of sideband enable signal of the packet. By way of illustration and not limitation, circuit logic of the router may evaluate a Boolean AND operation based on the sideband enable signal and a data valid signal of the packet.

Based on the evaluation at 315, method 300 may perform a selection from among a plurality of available modes. For example, where the evaluation at 315 detects that sideband data is indicated, method 300 may select, at 320, a first mode of the router which is to route the packet to communicate packet-switched sideband data from the router. By contrast, where the evaluation at 315 detects that sideband data is not indicated, method 300 may instead select, at 325, a second mode of the router which is to configure a circuit-switched channel according to the packet. The circuit-switched channel may be for communication of the first data received at 310 between a source node of a network and a destination node of the network. The selecting at 320 or the selecting at 325 may include or otherwise result in configuration logic of the router generating a signal to indicate such selection—e.g. to initiate configuration of the selected mode.

For example, as discussed herein, logic of the router which is to configure at least part of a circuit-switched channel may include circuitry which operates for the determining and/or communicating of a direction for that part of the circuit-switched channel. In such an embodiment, selection of the first mode at 320 may include selectively disabling such circuitry and/or the providing of an input to such circuitry. Alternatively or in addition, selection of the second mode at 325 may include selectively enabling such circuitry and/or the providing of an input to such circuitry.

FIG. 3B illustrates elements of a method 350 for providing network communication according to an embodiment. Some or all operations of method 350 may be performed by a network node having the functionality of such as that provided by one of routers R0, R1, R2, R3, R4 of die 200. For example, method 350 may be performed by a router (or core including such a router) which also performs method 300.

In an embodiment, method 350 includes, at 355, receiving at an input port of a router a packet from another router, the packet including a destination address, wherein a first address value of the destination address comprises a total of n bits. The destination address may include an address of a destination node for the packet—e.g. where the destination node is in a hierarchical network with the node which receives the packet at 355. For example, the hierarchy of such a hierarchical network may include a level N comprising the router a level N−1 lower than level N in the hierarchy. The level N−1 may comprise a plurality of nodes—e.g. including any of a variety of cores and/or routers—which are each to communicate with level N of the hierarchy via the router. In such an embodiment, the router may be positioned at the middle of an arrangement of such a plurality of nodes. Such an arrangement is illustrated, for example, by the relationship of router R0 to the surrounding routers R1, R2, R3, R4 and, similarly, by the arrangement of any of routers R1, R2, R3, R4 relative to their respective surrounding cores. Alternatively or in addition, the router may be one of such a plurality of nodes which are arranged around a different router.

Method 350 may further include, at 360, determining a value k corresponding to a level of the router in a hierarchy of the hierarchical network. For example, different hierarchical levels may each be assigned a particular shift value indicating, for each of one or more address values, the number of least significant bits of that address value which are to be shifted, discarded or otherwise ignored in evaluations performed to determine a direction to route the packet. Alternatively or in addition, such evaluations may be performed to determine a direction of at least part of a circuit-switched path to be configured based on the packet. As discussed herein, a lowest hierarchical level may, for example, correspond to a k value (shift value) of some baseline value—e.g. zero (0)—where the respective shift values for each next higher level in the hierarchy are successively higher by some incremental value—e.g. one (1).

Based on the value k, method 350 may include, at 365, evaluating the destination address to determine a direction of a packet-switched route for the packet, including performing comparisons based on the first address value, wherein, of the n bits of the first address value, the comparisons are based on only (n−k) bits. By way of illustration and not limitation, the evaluating at 365 may include performing comparisons variously based on (n−k) bits of an address value indicating position along a first dimension (e.g. an x-dimension) of a grid-like arrangement of the hierarchical network. Alternatively or in addition, such comparisons may be variously based on (n−k) bits of another address value indicating position along a second dimension (e.g. an y-dimension) of such a grid-like arrangement. In an embodiment, the evaluating at 365 may include performing comparisons based on an address value of the destination address and a corresponding address value for the router which is to perform method 350. The evaluating at 365 may include determining whether a destination node is within a range of rows of network nodes which include the router and/or whether the destination node is within a range of columns of network nodes which include the router. The size of the range of rows and/or the size of the range of columns may depend upon a level of the router in the hierarchy of the network.

Figure 4A:
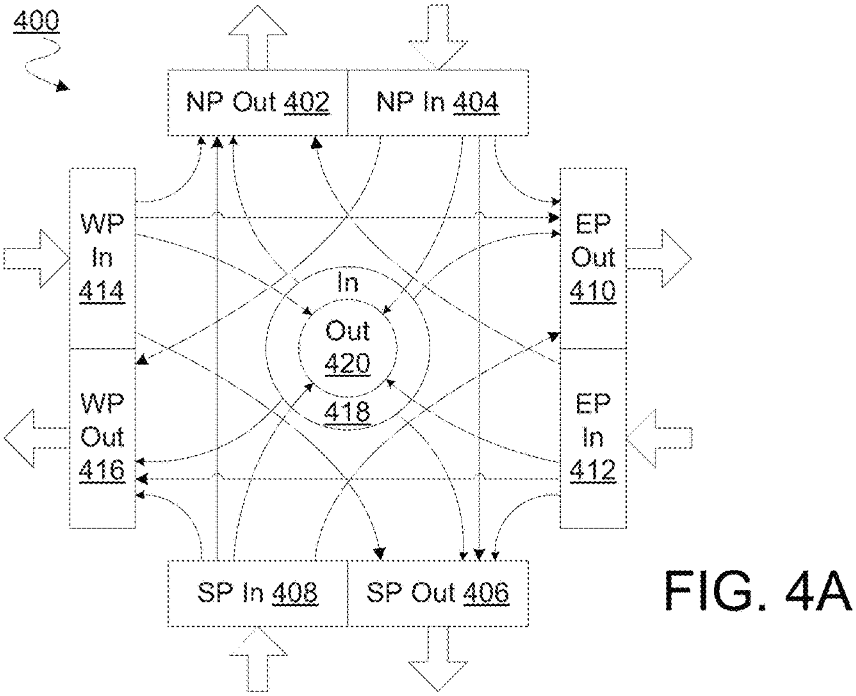
FIG. 4A is a block diagram illustrating elements of a router device according to an embodiment.

FIG. 4A illustrates elements of a router 400 to provide packet-switch routing and circuit-switched routing according to an embodiment. Router 400 may operate in a mesh network such as that of die 100 or a hierarchical network such as that of die 200, for example. In an embodiment, router 400 includes logic to perform some or all of the operations of method 300 and/or or method 350.

Router 400 may include some plurality of ports configured to variously couple to and communicate with adjoining network nodes. Ports or router 400 may be logically divided, for example, according to direction of adjoining nodes and/or direction of traffic exchanges with such nodes. For example, router 400 may include north port (NP) In 404 and NP Out 402 configured to (respectively) receive communications from and send communications to a node located in a "north" direction with respect to router 400. Similarly, router 400 may include a south port (SP) In 408 and a SP Out 406 configured to receive and send (respectively) communications with a node located in a "south" direction with respect to router 400. Additionally or alternatively, router 400 may include an east port (EP) In 412 and an EP Out 410 configured to receive and send (respectively) communications with a node located in a "east" direction with respect to router 400. Additionally or alternatively, router 400 may include a west port (WP) In 414 and a WP Out 416 configured to receive and send (respectively) communications with a node located in a "west" direction with respect to router 400.

In an embodiment, router 400 further comprises another input port 418 and an output port 420 configured to receive and send (respectively) communications with another agent of the network. In one embodiment, ports 418, 420 are for communications with processor logic of a "local" core which includes, is adjacent to, or is otherwise associated with router 400. In another embodiment, ports 418, 420 are for communications with a network node which is in a next level of a network hierarchy higher than that of router 400. In an embodiment, router 400 includes crossbar switching logic to provide the paths of inter-port communication shown in FIG. 4A.

Figure 4B:
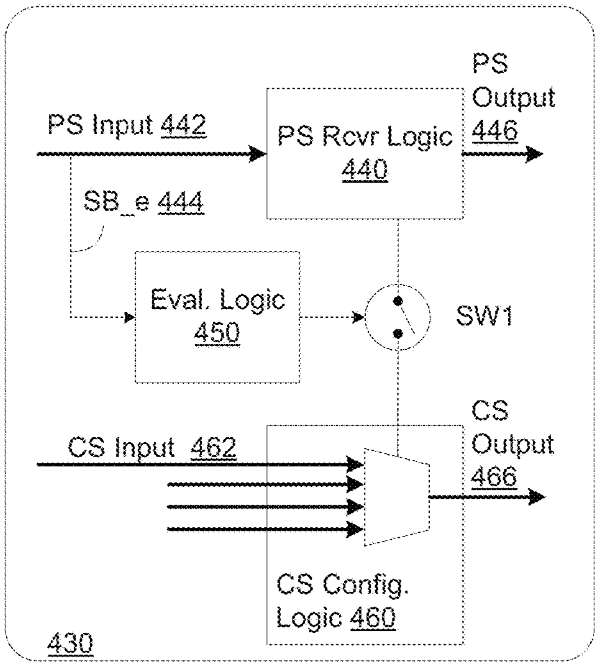
FIG. 4B is a block diagram illustrating elements of router circuitry to provide port-switching and circuit-switching according to an embodiment.

FIG. 4B illustrates elements of a router 430 for exchanging packet-switched communication and circuit-switched communication according to an embodiment. Router 430 may include some or all of the features of router 400, for example. Router 430 may include circuit logic to perform some or all of the operations of method 300.

Router 430 may include an input port to receive a packet from another router (not shown) which is networked with router 430. For example, an illustrative packet-switched (PS) input 442 may be received by PS receiver logic 440 of router 430, where PS input 442 includes one or more packets received over time. In an embodiment, a packet in PS input 442 includes control information—e.g. including a sideband enable signal SB_en 444—which router 430 may evaluate to determine an operational mode for router 430. By way of illustration and not limitation, router 430 may include evaluation logic 450 to receive some or all such control information, or—for example—to receive an output of some combinatorial logic (not shown) which operates on such control information. Such combinatorial logic may be included in evaluation logic 450, in certain embodiments.

Based on evaluation of the control information, evaluation logic 450 may signal configuration logic of router 430 to select between a plurality of operational modes of the router, the operational modes including a first mode for packet-switched routing for sideband data communications and a second mode for the configuration of at least part of a circuit-switched path. Such mode selection according to one embodiment is illustrated conceptually by a switch SW1 coupled between PS receiver logic 440 and circuit-switch (CS) configuration logic 460 of router 430. In an embodiment, CS configuration logic 460 includes multiplexer and/or other such logic to variously configure a circuit-switched path from any of a plurality of inputs, including a CS input 462, to a CS output 466. The plurality of inputs including CS input 462 may each be from a different respective input port of router 430.

In the second mode of router 430—e.g. where SW1 is configured as a closed switch—CS configuration logic 460 may configure such a circuit-switched path based on packet information received by PS receiver logic 440 in PS input 442. By contrast, in the first mode of router 430—e.g. where SW1 is configured as an open switch—CS configuration logic 460 may be prevented in one or more ways from configuring such a circuit-switched path. Additionally or alternatively, in the first mode, PS receiver logic 440 may perform packet-switched routing of the packet received in PS input 442—e.g. where such routing is to communicate sideband data in a PS output 446.

Figure 4C:
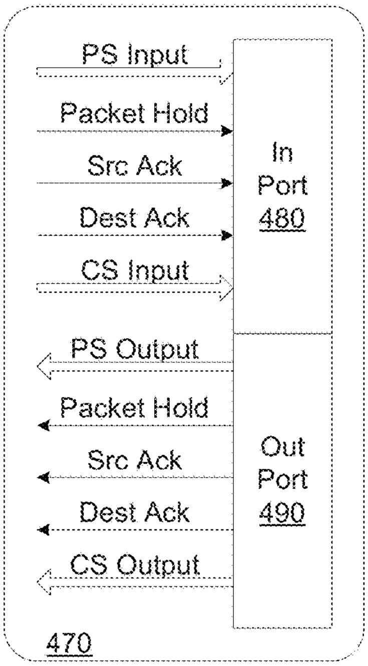
FIG. 4C is a block diagram illustrating elements of router ports according to an embodiment.

FIG. 4C illustrates elements of a hybrid packet-switched/circuit-switched router 470 according to an embodiment. Router 470 may include some or all of the features of router 430, for example. In an embodiment, router 470 includes an In port 480 to receive communications from another router and an Out port 490 to send communications to that other router. Router 470 may include multiple other such pairs of ports each for communications with a respective node of a network, according to different embodiments.

In port 480 may include one input portion configured to receive packet-switched communications (e.g. including entire packets or control portions of packets) and another input portion configured to receive circuit-switched communications (e.g. including data portions of packets). Such input portions are represented, respectively, by the illustrative PS input and CS input portions of In port 480. Similarly, Out port 490 may include a PS output portion to output packet-switched communications and a CS input portion to output circuit-switched communications.

In an embodiment, the configuring of a circuit-switched channel in a network which includes router 470 includes a configuration request message being received via the PS input portion of In port 480. Such a request message may result in a valid bit and direction information being stored in router 470, and may similarly cause respective valid bits and direction information being stored in various routers as it traverses the network. The direction information may be provided to configure one or more multiplexers of router 470 for providing the circuit-switched data path.

In an embodiment, respective acknowledge signals may be sent from each of the source node and the destination node of the at least partially formed circuit-switched path. Accordingly, In port 480 and Out port 490 may each include a respective source acknowledge (Src Ack) signal line and destination acknowledge (Dest Ack) signal line. The arrival of respective acknowledges from the source node and destination node may indicate to router 470 that the requested path is complete, and that a data transfer on the circuit-switched data path may commence. It may also clear the stored valid bit in router 470 to allow subsequent request packets to propagate through the network. In an embodiment, In port 480 and Out port 490 each further comprise a packet hold signal to provide for flow control between routers.

Figure 5A:
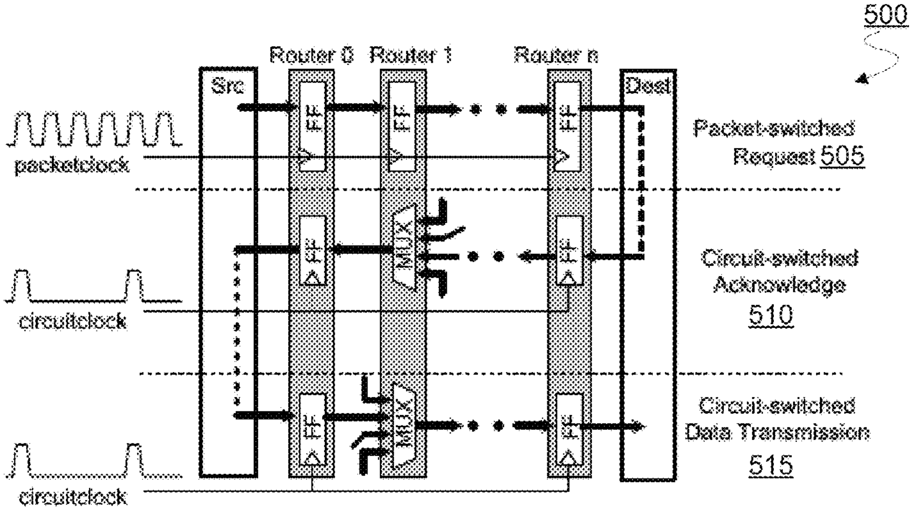
FIG. 5A is a sequence diagram illustrating elements of communications to configure a circuit-switched network path according to an embodiment.

FIG. 5A shows illustrative communications 500 exchanged according to an embodiment to configure a circuit-switched data path in a network. The communications 500 may be performed in a network such as that of die 100 and/or of die 200, for example. In an embodiment, communications 500 are performed with one or more routers which each variously provide some or all of the functionality of router 400.

In an embodiment, communications 500 include an exchange 500 of a packet-switched request to configure the circuit-switched pathway, the exchange 505 from a source node via n routers to a destination node. Such a request may be exchanged, for example, with either or both of PS input of In port 480 and PS output of Out port 490. The exchange 505 may be followed by a circuit-switched exchange 510 of an acknowledge message back to the source node to confirm configuration of the circuit-switched path. After the acknowledge exchange 510, a circuit-switched data exchange 515 may take place via the circuit-switched path.

To improve data throughput, different clocks may be used synchronize the request packet-switched and data circuit-switched portions of the network. A packet-switched request may travel only between neighboring nodes for each cycle of a clock, whereas circuit-switched data may travel across the whole network in a single clock cycle. Accordingly, a packet-switched portion of a network may operate with a higher frequency clock (packetclock) than another clock (circuitclock) for a circuit-switched portion of the network. Alternatively or in addition, one circuit-switched data transmission may be taking place concurrently with an exchange of acknowledges for one or more future transmissions and/or concurrently with an exchange of one or more requests for circuit-switched paths to be configured. Accordingly, a router participating in such exchanges may prepare for future circuit-switched path configurations by determining and storing the routing direction for a future data transmission.

Figure 5B:
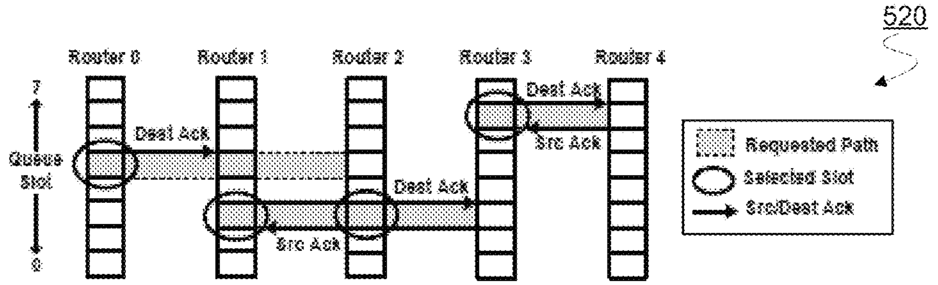
FIG. 5B is a sequence diagram illustrating elements of communications to configure a circuit-switched network path according to an embodiment.

FIG. 5B illustrates elements of communications 520 to configure a circuit-switched data path according to an embodiment. Communications 520 may include some or all of the features of communications 500, for example. For example, communications 520 include a destination acknowledge (Dest Ack) traversing a network path from a router 0 to a router 4. Communications 520 may also include a source acknowledge (Src Ack) message traversing along the network path in the opposite direction.

In order to improve resource utilization with distributed control, respective queue slots may operate in routers 0 through 4 to concurrently store respective information for multiple requested paths. This provides several potential paths for the circuit-switched network to choose from during the acknowledge phase. As each request packet propagates from one router to the next, routing directions may be stored in respective queue slots at each of a plurality of routers. During a circuitclock cycle, for example, circuit logic of a router port may select one of its queue slots, based on a rotating priority, as illustrated FIG. 6. The direction previously stored in that queue slot may be used to route a Src Ack and/or a Dest Ack signal. Arrival of both a Src Ack and a corresponding Dest Ack at a router along the path may indicates that the complete path is configured for data transmission in the next circuitclock cycle. Paths that are not ready may have to wait for a future circuitclock cycle, while ready paths may free their resources following data transmission.

Figure 5C:
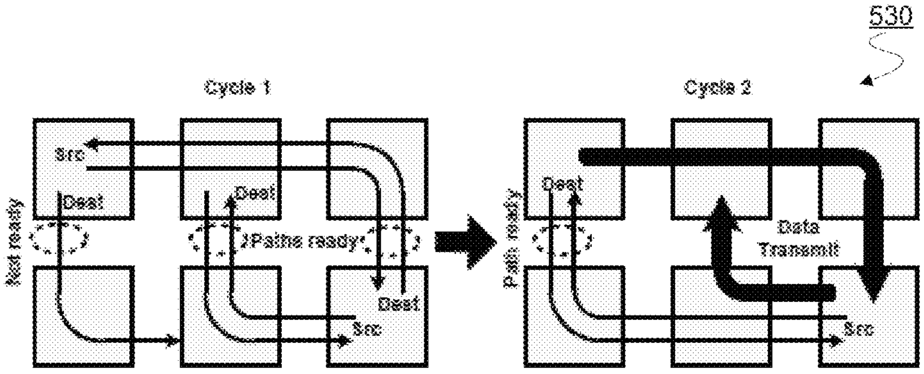
FIG. 5C is a sequence diagram illustrating elements of network messaging according to an embodiment.

FIG. 5C illustrates a sequence 530 of circuit-switched communications performed according to an embodiment. Although certain embodiments are not limited in this regard, sequence 530 may be performed in a network such as that of die 100. Sequence 530 may include or otherwise be based on communications 500 and/or communications 520, for example.

A portion of communications 530 takes place in a cycle 1 of a clock (e.g. circuitclock), during which two circuit-switched paths are configured (ready), and a third path is not yet configured. During cycle 1, respective exchanges of acknowledge messages, such as those of communications 520, are performed for two circuit-switched paths to indicate that such paths are configured (ready). A third such path is not yet ready during cycle 1, at least insofar as an exchange of such acknowledge messages for the third path is awaiting completion of the acknowledge message exchange for one of the ready paths.

During a next cycle 2 of communications 530, the circuit-switched paths which were acknowledged as ready in cycle 1 may perform data transmission—e.g. using respective CS input and CS output portions of various routers' ports. Concurrent with the circuit-switched data exchanges in cycle 2, the acknowledgement exchange for the third path may be completed to indicate readiness of that third path for a data exchange—e.g. in some later clock cycle (not shown). As illustrated in FIG. 5C, a mesh network according to an embodiment may use what is referred to as x-first, y-second (or y-first, x-second) routing, wherein a packet is initially routed along a first direction in the network grid, and then routed along a perpendicular direction in the network grid—e.g. without subsequently being routed along the first direction.

Figure 6:
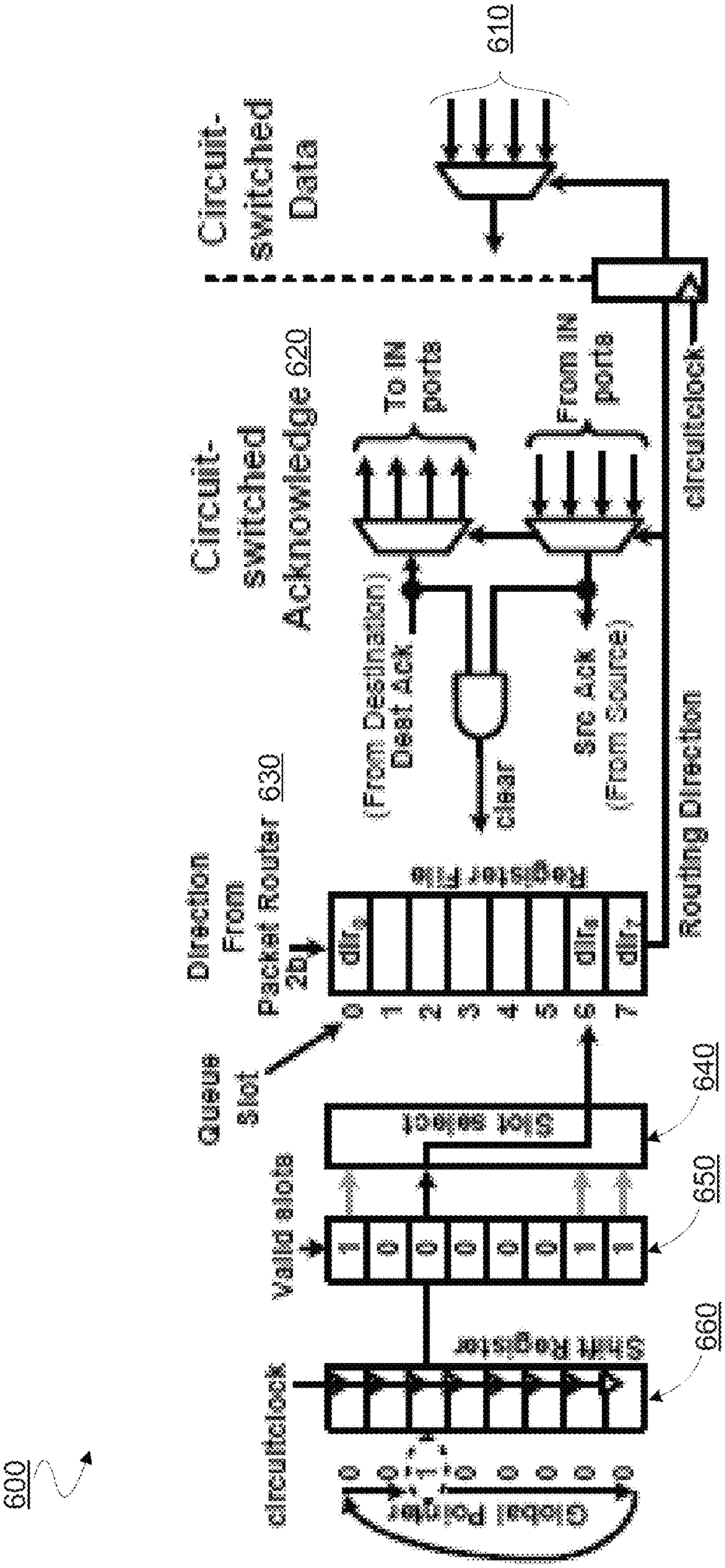
FIG. 6 is a block diagram illustrating elements of circuitry to configure a circuit-switched network path according to an embodiment.

FIG. 6 illustrates elements of an integrated circuit 600 to provide packets-switched routing and circuit-switched routing according to an embodiment. Integrated circuit 600 may include some or all of the functionality of router 400 for example. By way of illustration and not limitation, integrated circuit 600 may include one or more routers of die 100 and/or die 200.

In an embodiment, integrated circuit 600 includes inputs 610 each of a different respective input port of a router. The router may include logic—represented in FIG. 6 by an illustrative multiplexer—to selectively configure at different times different circuit-switched paths between input ports of the router and an output port of the router. Alternatively or in addition, the router may include circuit-switched (CS) acknowledge logic 620 to variously multiplex, at different times, any of various Src Ack signal lines of respective input ports of the router to a Src Ack signal line of an output port of the router. Alternatively or in addition, CS acknowledge logic 620 may variously demultiplex at different times a Dest Ack signal line of an input port to any of various Dest Ack signal lines of respective output ports of the router.

Integrated circuit 600 may include a register file 630 (or other repository) to store direction information—e.g. based on packet-switched information received by the router. At each packet clock, a direction value (a 2-bit value, in this example) may be written to latches addressed by a respective queue entry (or "slot"). The direction information may indicate a direction of a circuit-switched routing for a future data exchange. For example, a slot in the direction register file 630 may be provided as output to determine a multiplexing of inputs 610. In an embodiment, slot selection logic 640 selects an entry of direction register file 630 to provide such an output. The selection by slot selection logic 640 may be based on a set of validity bits 650 indicating which whether a corresponding slot of the direction register file 630 corresponds to valid data. The values of the set of validity bits 650 may each be variously based on control information of respective packet-switched information received by the router.

In an embodiment, bidirectional source and destination acknowledges may be sent across the network in successive circuitclock cycles. A global pointer for a shift register 660 may provide the starting point for a selection from the set of validity value slots 650. In a given circuitclock cycle, the slot select circuit 640 may search for a next valid queue slot starting at a current pointer position. Rotating this pointer each cycle using shift register 660 may improve fairness and prevent starvation. Use of a global pointer across multiple routers may ensure that common paths are selected.

Figure 7:
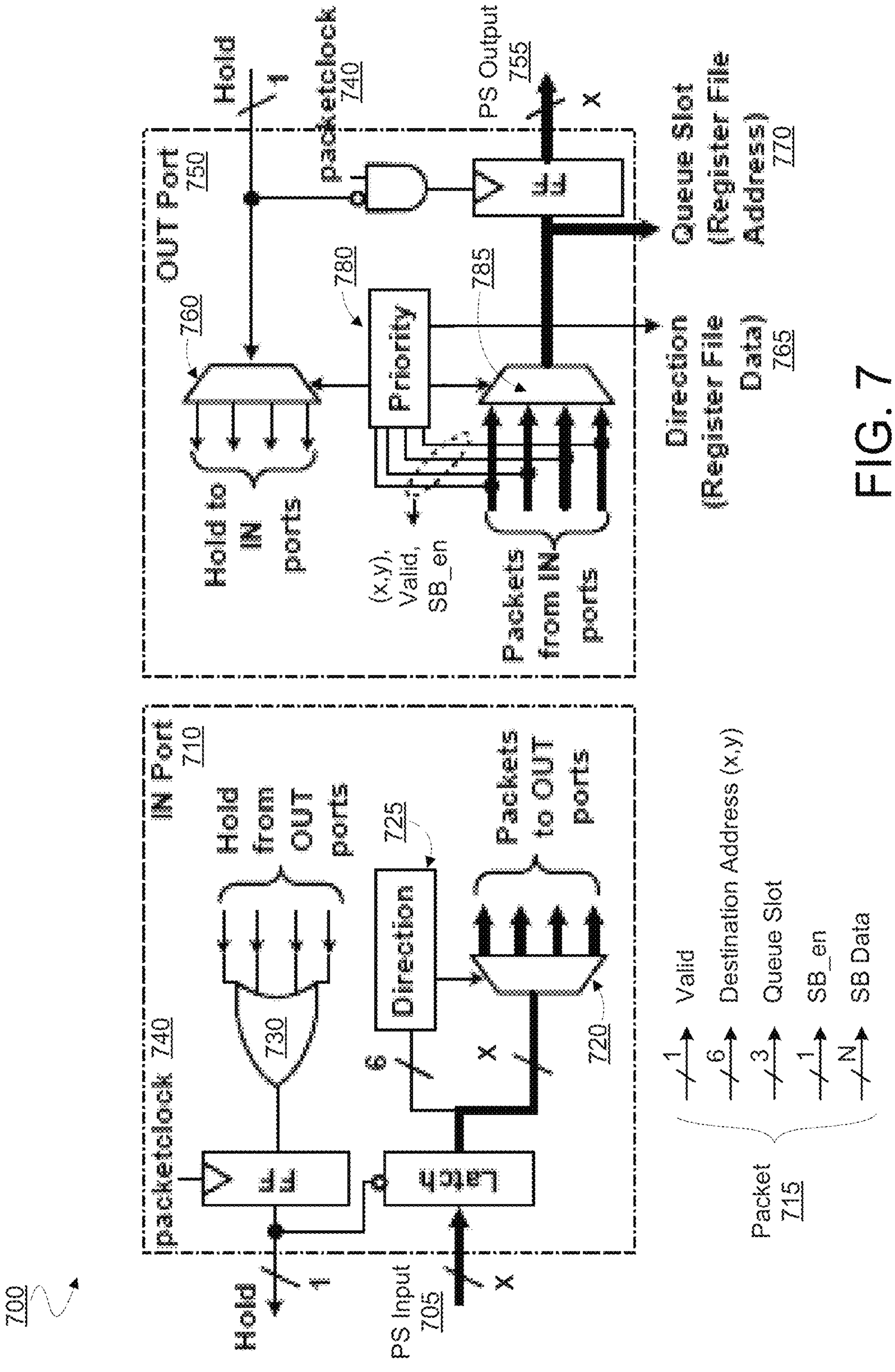
FIG. 7 is a block diagram illustrating elements of circuitry to perform routing based on packet information according to an embodiment.

FIG. 7 illustrates elements of a router 700 to perform packet-switched routing and circuit-switched routing according to an embodiment. Router 700 may operate in a network having some of all of the features of the network of die 100 (or alternatively, of die 200). For example, router may provide the functionality of router 400, of the router of integrated circuit 600, and/or the like. In an embodiment, router 700 include logic to perform some or all of the operations of method 300 and/or some or all of the operations of method 350.

In an embodiment, router 700 includes an IN port 710 comprising a portion to receive packet-switched communications sent to router 700 and an OUT port 750 comprising a portion to send packet-switched information from router 700. IN port 710 and OUT port 750 may further comprise respective other portions (not shown) to exchange circuit switched information—e.g. where such other portions include respective configuration logic each to configure at least part of a respective circuit-switched path—e.g. where such configuration is performed in advance of router 700 receiving data to be communicated along that circuit-switched path.

IN port 710 may include multiplexer logic 720 to variously demultiplex, at different times, X signal lines of a PS input 705—where X is some integer—to any of a plurality of output ports of router 700. Operation of multiplexer logic 720 may facilitate packet-switched routing of a packet received via PS input 705. By way of illustration and not limitation, the X signal lines of PS input 705 may provide for the illustrated format of a packet 715 received via PS input 705. More particularly, packet 715 may include destination address bits comprising, for example, a three-bit address value indicating a location along an x-axis for a grid of the network, and another three-bit address value indicating a location along a y-axis for the grid. In an embodiment, direction logic 725 may evaluate such address values to determine a path of multiplexer logic 720 for directing packet 715 to a correct output port.

Alternatively or in addition, OUT port 750 may include demultiplexer logic 785 to variously demultiplex, at different times, any of a plurality of PS inputs (each from a respective input port of router 700) to X signal lines of a PS output 755. Operation of multiplexer logic 720 may facilitate packet-switched routing of packets such as packet 715. By way of illustration and not limitation, packet 715 may include a valid bit indicating the validity (e.g. presence) of packet 715 and/or a sideband enable (SB_en) bit—or bits—indicating whether packet 715 includes data to be sent as part of a sideband communication. In an embodiment, SB_en is evaluated—e.g. in combination with the valid bit by priority logic 780—to determine whether packet 715 is to be forwarded as a packet of a sideband communication or whether packet 715 is to be used for configuring some or all of a circuit-switched path.

For example, priority logic 780 may receive and evaluate one or more SB_en, a validity value, and destination address information of the packet. As result of such evaluation, priority logic 780 may provide an output 765 indicating whether direction data is to be communicated for the configuring of a circuit-switched path. Output 765 may include such direction data in an embodiment. Alternatively, output 765 may control an outputting of such direction data by direction logic 725.

For example, direction data for the packet may be written to the direction register file in the case where priority logic 780 determines that packet 715 is a request for circuit-switched path configuration. A queue slot output 770 may also be provided to facilitate subsequent a locating of where output 765 for packet 715 is written to the direction register file. For example, packet 715 may further comprises a queue slot value (e.g. a three-bit value, in this example) indicating a slot value to be associated with packet 715, where output 770 includes or is otherwise based on such a queue slot value.

In an embodiment, the writing of such direction data may be selectively prevented or modified where priority logic 780 determines that packet 715 is for a communication of sideband data. In an embodiment, the providing of output 770 may be selectively prevented or otherwise altered where it is determined that packet 715 is for sideband data communication. The sideband data of packet 715 is represented by an illustrative N bits to accommodate such data—e.g. where X is equal to (N+11) in the illustrative embodiment of router 700.

In an embodiment, control of packet-switched operation may be based on and/or regulate the communication of other control signaling. By way of illustration and not limitation, a latching of PS input 705 may be based on a hold signal generated by combinatorial logic 730 operating on hold signals from various out ports. Alternatively or in addition, a latching of PS output 755 may be based on a hold signal for OUT port 750. In an embodiment, OUT port 750 includes or couples to multiplexer logic 760 to direct the hold signal for OUT port 750 to any of various input ports of router 700.

Figure 8A:
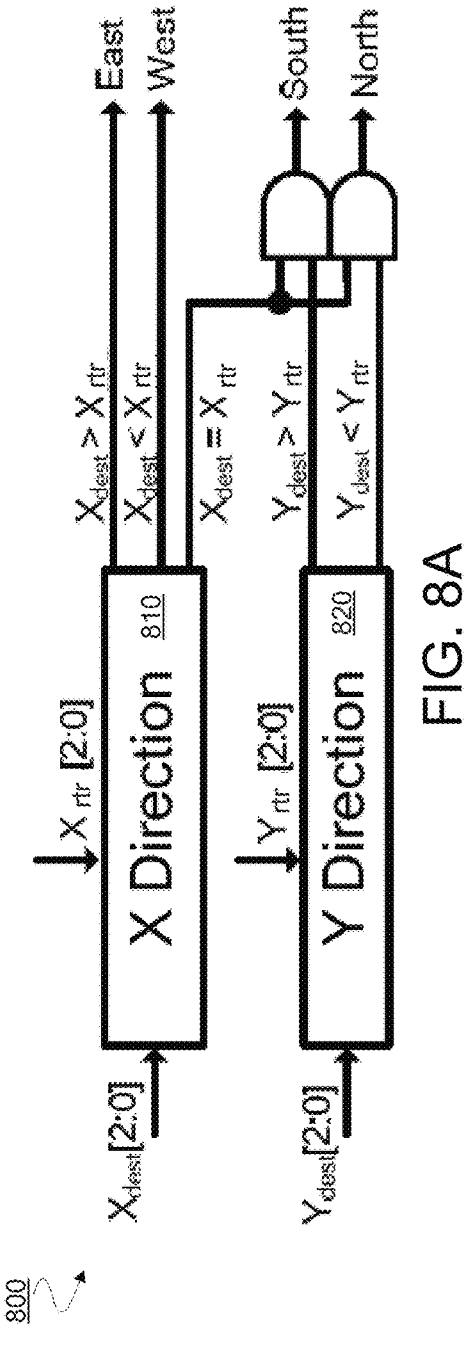
FIG. 8A is a block diagram illustrating elements of circuitry for packet-switched routing in a mesh network according to an embodiment.

FIG. 8A illustrates elements of direction logic 800 for determining a direction of packet-switched information according to an embodiment. Direction logic 800 may operate in a device having some of all of the features of router 400, for example. Direction logic 800 is one example of logic for implementing x-first, y-second routing—e.g. for a mesh network such as that of die 100. In an embodiment, direction logic provides functionality corresponding to that of direction logic 725 or priority logic 780.

In an embodiment, direction logic 800 includes a first circuitry 810 to compare address values associated with a first dimension of a two-dimensional address space. Second circuitry 820 of the direction logic may further compare address values associated with a second dimension of the address space. The dimensions of the address space may correspond or otherwise relate to a physical layout of network nodes—e.g. as such nodes are located in a grid-like pattern for a die. Various directions of such a physical layout—e.g. relative to a location of router 800 in that layout—are referred to in FIG. 8A using the labels "North" "South" "East" and "West"

Figure 8B:
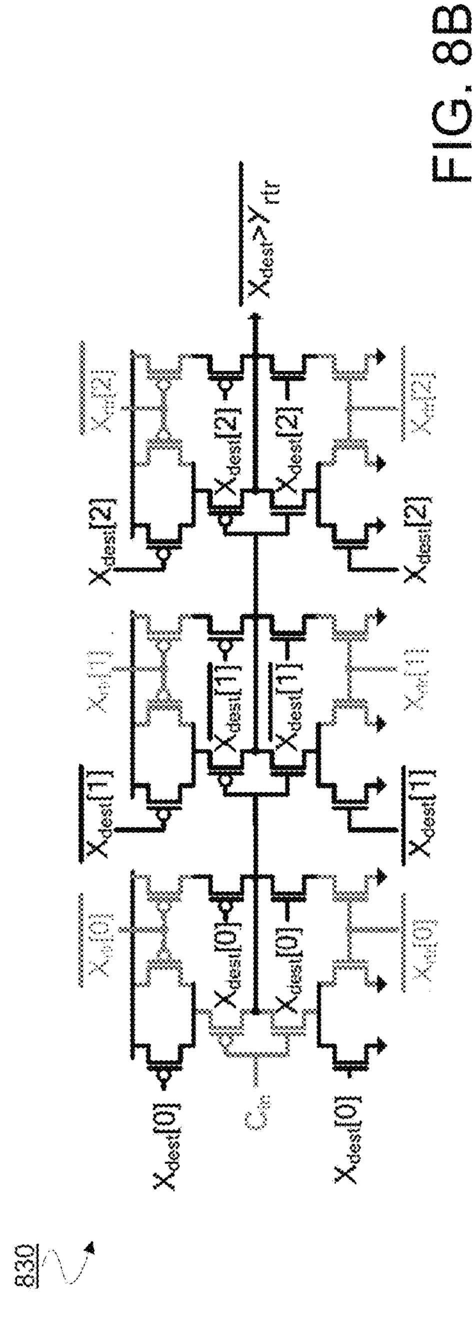
FIG. 8B is a circuit diagram illustrating elements of circuitry for packet-switched routing in a mesh network according to an embodiment.

By way of illustration and not limitation, first circuitry 810 may receive respective x-dimension values of an address of router 800 and of an address of a destination node for a packet received by router 800. Alternatively or in addition, second circuitry 820 may receive respective y-dimension values of the address of router 800 and the address of the destination node. In an embodiment, comparisons of such address values are variously performed by first circuitry 810 and second circuitry 810. FIG. 8B illustrates one example of circuitry 830 for performance of such comparison, according to an embodiment. Based on the comparing by first circuitry 810 and second circuitry 820, direction logic 800 may whether a next routing of the packet from router 800 toward the destination node is to be in a particular direction—e.g. North, South, East or West relative to router 800.

Figure 9:
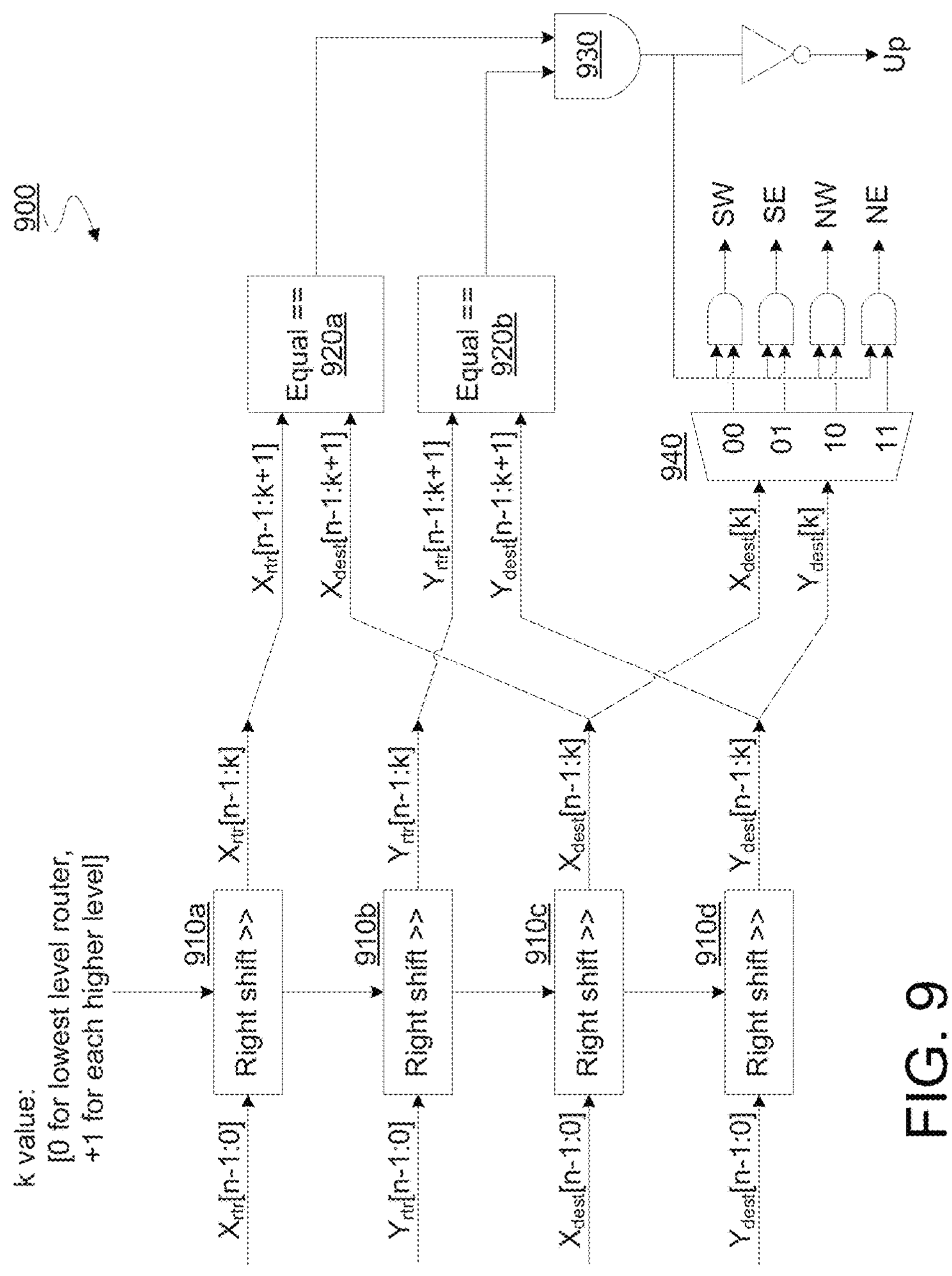
FIG. 9 is a block diagram illustrating elements of circuitry for packet-switched routing in a hierarchical network according to an embodiment.

FIG. 9 illustrates elements of direction logic 900 for determining a direction of packet-switched information according to an embodiment. Direction logic 900 may operate in a device having some of all of the features of router 400, for example. Direction logic 900 is one example of logic for implementing routing for a hierarchical network such as that of die 200. Direction logic 900 may provide functionality corresponding to that of direction logic 725 or priority logic 780. In an embodiment, a router includes direction logic providing functionality of both direction logic 800 and direction logic 900—e.g. where the router may be variously configured (e.g. reconfigured) to select a particular one of routing for communication in a mesh network and routing for communication in a hierarchical network.

A router including direction logic 900 may be addressable by two n-bit address values Xrtr[n−1:0], Yrtr[n−1:0] corresponding to respective dimensions (x and y, respectively) of a 2D address space. At some point in time, the router may receive a packet destined for a network node which is addressable by two other n-bit address values Xdest[n−1:0], Ydest[n−1:0] of an address in the address space. Direction logic 900 may perform an evaluation based on some or all bits of the address values Xrtr[n−1:0], Yrtr[n−1:0], Xdest [n−1:0], Ydest[n−1:0] to determine a direction to send the packet from the router.

In an embodiment, the dimensions of the address space correspond or otherwise relate to a physical layout of network nodes. Various directions of such a physical layout—e.g. relative to a location of a router which includes direction logic 900—are referred to in FIG. 9 using the labels SW (southwest), SE (southeast), NW (northwest) and NE (northeast). In an embodiment, some or all of the directions SW, SE, NW, NE each include a respective combination of an offset along the x-dimension relative to the router and an offset along the y-dimension relative to the router.

In an embodiment, direction logic 900 includes shift registers 910*a*, 910*b*, 910*c*, 910*d* to receive, respectively, Xrtr[n−1:0], Yrtr[n−1:0], Xdest[n−1:0] and Ydest[n−1:0]. Additionally, shift registers 910*a*, 910*b*, 910*c*, 910*d* may receive a shift value k indicating a number of address value bits to be excluded from subsequent evaluation by direction logic 900. For example, based on the shift value k, each of shift registers 910*a*, 910*b*, 910*c*, 910*d* may shift, discard or otherwise exclude from subsequent processing k bits—e.g. the k least significant bits—of the respective address value received by that shift register.

For example, shift registers 910*a*, 910*b*, 910*c*, 910*d* may variously distribute the respective (n−k) most significant bits of each of Xrtr[n−1:0], Yrtr[n−1:0], Xdest[n−1:0] and Ydest [n−1:0] for subsequent evaluation. In an embodiment, equality detect logic 920*a* of direction logic 900 may receive from shift registers 910*a*, 910*c* the (n−k−1) most significant bits Xrtr[n−1:k+1] of Xrtr[n−1:0] and the (n−k−1) most significant bits Xdest[n−1:k+1] of Xdest[n−1:0]. Furthermore, equality detect logic 920*b* may receive from shift registers 910*b*, 910*d* the (n−k−1) most significant bits Yrtr[n−1:k+1] of Yrtr[n−1:0] and the (n−k−1) most significant bits Ydest [n−1:k+1] of Ydest[n−1:0]. The equality detect logic 920*a*, 930*b* may determine whether the destination node is within a particular range of rows which includes and router comprising direction logic 900, and/or whether the destination node is within a particular range of columns which includes the router. The size of the range of rows and/or the range of columns may be relatively large for a router in a high level of the hierarchy, as compared to being in a low level of the hierarchy. This allows for simpler and/or faster direction determining higher in the hierarchy of a network.

Further still, selector logic 940 may receive Xdest[k] and Ydest[k] from shift registers 910*c*, 910*d*. Combinatorial logic 930 may receive respective outputs from equality detect logic 910, 920 and output a logic high signal if both Xrtr[n−1:k+1] and Xdest[n−1:k+1] are equal to one another and Yrtr[n−1:k+1] and Ydest[n−1:k+1] are equal to one another. Such a logic high signal may enable selection of an output from selector logic 940 based on the received Xdest [k] and Ydest[k]. For example, an enabled output may select one of the directions SW, SE, NW, NE—e.g. where such directions correspond to respective nodes which are each at a hierarchical level lower than that of the router which includes direction logic 900. Otherwise, in the case where an output of combinatorial logic 930 is logic low, direction logic may provide an Up signal indicating that the packet is to be routed to a higher level in the hierarchy of the network.

In one implementation, an integrated circuit comprises a first router including a first input port comprising a first input portion to receive a first packet from a second router, the first packet including control information, and a second input portion to receive first data from the second router. The first router includes evaluation logic to perform an evaluation of the control information, and configuration logic to perform, based on the evaluation, a selection from among a first mode of the first router to route the first packet to communicate packet-switched sideband data from the first router, and a second mode of the first router to configure a circuit-switched channel according to the first packet, the circuit-switched channel for communication of the first data between a source node and a destination node.

In an embodiment, the evaluation logic to perform the evaluation of the control information includes the evaluation logic to evaluate a sideband enable signal of the first packet. In another embodiment, the evaluation logic to evaluate the sideband enable signal includes the evaluation logic to evaluate a Boolean AND of the sideband enable signal and a data valid signal of the first packet. In another embodiment, the first router comprises a direction register file and logic to determine a direction of a circuit-switched route based on the direction register file, and wherein the configuration logic to select the first mode, including the configuration logic to prevent a write to the direction register file. In another embodiment, the first router comprises an output port and priority logic to select from among a plurality of input ports of the first router to provide a packet to the output port, wherein the configuration logic to prevent the write to the direction register file includes the configuration logic to disable the priority logic or to switchedly decouple the priority logic from the direction register file. In another embodiment, the first router is to concurrently perform packet-switched routing of the sideband data and circuit-switched routing of other data. In another embodiment, the first input portion is further to receive a second packet from a second router, the second packet including second control information, wherein the evaluation logic to perform an evaluation of the second control information and, wherein the configuration logic to perform, based on the evaluation of the second control information, a selection from among the first mode to route the second packet to communicate second packet-switched sideband data from the first router, and the second mode to configure a second circuit-switched channel according to the second packet. In another embodiment, wherein, for each packet of a sequence of packets received via the first input portion, the evaluation logic is to perform a respective evaluation of the packet, and the evaluation logic is to perform a selection between the first mode and the second mode based on the respective evaluation. In another embodiment, wherein the network comprises a mesh network.

In another embodiment, wherein the network comprises a hierarchical network. In another embodiment, a hierarchy of the hierarchical network includes a level N comprising the first router, and a level N−1 lower than level N in the hierarchy, the level N−1 comprising a plurality of nodes each to communicate with the level N via the first router, wherein the first router is positioned at a middle of an arrangement of the plurality of nodes. In another embodiment, a hierarchy of the hierarchical network includes a level N comprising the second router, and a level N−1 lower than level N in the hierarchy, the level N−1 comprising a plurality of nodes including the first router, the plurality of nodes each to communicate with the level N via the second router, wherein the second router is positioned at a middle of an arrangement of the plurality of nodes. In another embodiment, a lowest level of the hierarchy includes a first node and a second lowest level of the hierarchy includes a second node coupled to the first node via a channel, wherein, for a plurality of repeaters of the hierarchical network, a distance of the repeater from a respective adjacent node of the network is equal to a length of the channel. In another embodiment, integrated circuit further comprises logic to determine a value k corresponding to a level of the first router in the hierarchy, and based on the value k, to evaluate a destination address of the packet to determine a direction of a packet-switched routing of the packet, the destination address including a first address value comprising a total of n bits, where the logic to evaluate the destination address includes the logic to perform comparisons based on only (n−k) bits of the first address value. Certain embodiments include a combination of some or all of the features of the above embodiments.

In another implementation, a method at an integrated circuit comprises receiving a first packet at a first input port of a first router, the first packet including control information, wherein the first packet is received from a second router via a first input portion of the first input port, and receiving first data from the second router via a second input portion of the first input port. The method further comprises performing an evaluation of the control information, and based on the evaluation, performing a selection from among a first mode of the first router to route the first packet to communicate packet-switched sideband data from the first router, and a second mode of the first router to configure a circuit-switched channel according to the first packet, the circuit-switched channel for communication of the first data between a source node of a network and a destination node of the network.

In an embodiment, performing the evaluation of the control information includes evaluating a sideband enable signal of the first packet. In another embodiment, evaluating the sideband enable signal includes evaluating a Boolean AND of the sideband enable signal and a data valid signal of the first packet. In another embodiment, the first router comprises a direction register file and logic to determine a direction of a circuit-switched route based on the direction register file, the method further comprising, based on a selection of the first mode, preventing a write to the direction register file. In another embodiment, the first router comprises an output port and priority logic to select from among a plurality of input ports of the first router to provide a packet to the output port, wherein preventing the write to the direction register file includes disabling the priority logic or switchedly decoupling the priority logic from the direction register file. In another embodiment, the first router concurrently performs packet-switched routing of the sideband data and circuit-switched routing of other data. In another embodiment, the method further comprises receiving via the first input portion a second packet from the second router, the second packet including second control information, performing an evaluation of the second control information, and based on the evaluation of the second control information, performing a selection from among the first mode to route the second packet to communicate second packet-switched sideband data from the first router, and the second mode to configure a second circuit-switched channel according to the second packet. In another embodiment, the method further comprises, for each packet of a sequence of packets received via the first input portion, performing a respective evaluation of the packet and performing a selection between the first mode and the second mode based on the respective evaluation. In another embodiment, wherein the network comprises a mesh network.

In another embodiment, wherein the network comprises a hierarchical network. In another embodiment, a hierarchy of the hierarchical network includes a level N comprising the first router, and a level N−1 lower than level N in the hierarchy, the level N−1 comprising a plurality of nodes each to communicate with the level N via the first router, wherein the first router is positioned at a middle of an arrangement of the plurality of nodes. In another embodiment, a hierarchy of the hierarchical network includes a level N comprising the second router, and a level N−1 lower than level N in the hierarchy, the level N−1 comprising a plurality of nodes including the first router, the plurality of nodes each to communicate with the level N via the second router, wherein the second router is positioned at a middle of an arrangement of the plurality of nodes. In another embodiment, a lowest level of the hierarchy includes a first node and a second lowest level of the hierarchy includes a second node coupled to the first node via a channel, and wherein, for a plurality of repeaters of the hierarchical network, a distance of the repeater from a respective adjacent node of the network is equal to a length of the channel. In another embodiment, the method further comprises determining a value k corresponding to a level of the first router in the hierarchy, and based on the value k, evaluating a destination address of the packet to determine a direction of a packet-switched routing of the packet, the destination address including a first address value comprising a total of n bits, the evaluating including performing comparisons based on only (n−k) bits of the first address value. Certain embodiments include a combination of some or all of the features of the above embodiments.

In another implementation, an integrated circuit die includes a plurality of routers coupled with one another in a network, the plurality of routers including a first router and a second router. The first router comprises a first input portion to receive a first packet from the second router, the first packet including control information, and a second input portion to receive first data from the second router. The first router includes evaluation logic to perform an evaluation of the control information, and configuration logic to perform, based on the evaluation, a selection from among a first mode of the first router to route the first packet to communicate packet-switched sideband data from the first router, and a second mode of the first router to configure a circuit-switched channel according to the first packet, the circuit-switched channel for communication of the first data between a source node and a destination node.

In an embodiment, the evaluation logic to perform the evaluation of the control information includes the evaluation logic to evaluate a sideband enable signal of the first packet. In another embodiment, the first router comprises a direction register file and logic to determine a direction of a circuit-switched route based on the direction register file, and wherein the configuration logic to select the first mode, including the configuration logic to prevent a write to the direction register file. In another embodiment, the first router is to concurrently perform packet-switched routing of the sideband data and circuit-switched routing of other data. Certain embodiments include a combination of some or all of the features of the above embodiments.

In another implementation, an integrated circuit comprises a first router including a first input port to receive from a second router a first packet including a destination address, wherein a first address value of the destination address comprises a total of n bits. The first router includes direction logic to determine a value k corresponding to a level of the first router in a hierarchy of a hierarchical network, wherein based on the value k, the direction logic further to evaluate the destination address to determine a direction of a packet-switched route for the first packet, including the direction logic to perform comparisons based on the first address value, wherein, of the n bits of the first address value, the comparisons are based on only (n−k) bits. In an embodiment, the hierarchy includes a level N comprising the first router, and a level N−1 lower than level N in the hierarchy, the level N−1 comprising a plurality of nodes each to communicate with the level N via the first router, wherein the first router is positioned at a middle of an arrangement of the plurality of nodes. In another embodiment, a lowest level of the hierarchy includes a first node and a second lowest level of the hierarchy includes a second node coupled to the first node via a channel, and wherein, for a plurality of repeaters of the hierarchical network, a distance of the repeater from a respective adjacent node of the network is equal to a length of the channel. Certain embodiments include a combination of some or all of the features of the above embodiments.

In another implementation, an integrated circuit comprises means for receiving a first packet at a first input port of a first router, the first packet including control information, wherein the first packet is received from a second router via a first input portion of the first input port. The integrated circuit further comprises means for receiving first data from the second router via a second input portion of the first input port, means for performing an evaluation of the control information, and based on the evaluation, means for performing a selection from among a first mode of the first router to route the first packet to communicate packet-switched sideband data from the first router, and a second mode of the first router to configure a circuit-switched channel according to the first packet, the circuit-switched channel for communication of the first data between a source node of a network and a destination node of the network.

In an embodiment, means for performing the evaluation of the control information includes means for evaluating a sideband enable signal of the first packet. In some or all of the above embodiments, means for evaluating the sideband enable signal includes means for evaluating a Boolean AND of the sideband enable signal and a data valid signal of the first packet. In some or all of the above embodiments, the first router comprises a direction register file and logic to determine a direction of a circuit-switched route based on the direction register file, the integrated circuit further comprising means for preventing, based on a selection of the first mode, a write to the direction register file. In some or all of the above embodiments, the first router comprises an output port and priority logic to select from among a plurality of input ports of the first router to provide a packet to the output port, and wherein means for preventing the write to the direction register file includes means for disabling the priority logic or means for switchedly decoupling the priority logic from the direction register file. In some or all of the above embodiments, the first router concurrently performs packet-switched routing of the sideband data and circuit-switched routing of other data. In some or all of the above embodiments, the integrated circuit further comprises means for receiving via the first input portion a second packet from the second router, the second packet including second control information, means for performing an evaluation of the second control information, and based on the evaluation of the second control information, means for performing a selection from among the first mode to route the second packet to communicate second packet-switched sideband data from the first router, and the second mode to configure a second circuit-switched channel according to the second packet. In some or all of the above embodiments, the integrated circuit further comprises for each packet of a sequence of packets received via the first input portion, means for performing a respective evaluation of the packet, and means for performing a selection between the first mode and the second mode based on the respective evaluation. In some or all of the above embodiments, the network comprises a mesh network.

In some or all of the above embodiments, the network comprises a hierarchical network. In some or all of the above embodiments, a hierarchy of the hierarchical network includes a level N comprising the first router, and a level N−1 lower than level N in the hierarchy, the level N−1 comprising a plurality of nodes each to communicate with the level N via the first router, wherein the first router is positioned at a middle of an arrangement of the plurality of nodes. In some or all of the above embodiments, a hierarchy of the hierarchical network includes a level N comprising the second router, and a level N−1 lower than level N in the hierarchy, the level N−1 comprising a plurality of nodes including the first router, the plurality of nodes each to communicate with the level N via the second router, wherein the second router is positioned at a middle of an arrangement of the plurality of nodes. In some or all of the above embodiments, a lowest level of the hierarchy includes a first node and a second lowest level of the hierarchy includes a second node coupled to the first node via a channel, and wherein, for a plurality of repeaters of the hierarchical network, a distance of the repeater from a respective adjacent node of the network is equal to a length of the channel. In some or all of the above embodiments, the integrated circuit further comprises means for determining a value k corresponding to a level of the first router in the hierarchy, and means for evaluating, based on the value k, a destination address of the packet to determine a direction of a packet-switched routing of the packet, the destination address including a first address value comprising a total of n bits, the evaluating including performing comparisons based on only (n−k) bits of the first address value. Certain embodiments include a combination of some or all of the features of the above embodiments.

Techniques and architectures for exchanging communications in a network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A router including:

a first input port comprising:

a first input portion to receive a first packet from another router, the first packet including control information; and a second input portion to receive first data from the other router;

wherein the router includes:

evaluation logic comprising circuitry configured to perform an evaluation of the control information, including the evaluation logic to evaluate a sideband enable signal of the first packet and to evaluate a data valid signal of the first packet; and configuration logic comprising circuitry configured to perform, based on the evaluation of both the sideband enable signal and the data valid signal, a selection from among:

a first mode of the router to route the first packet to communicate packet-switched sideband data from the router; and a second mode of the router to configure a circuit-switched channel according to the first packet, the circuit-switched channel for communication of the first data between a source node and a destination node.

2. The router of claim 1, wherein the evaluation logic to evaluate the control information includes the evaluation logic to evaluate a Boolean AND of the sideband enable signal and the data valid signal.

3. The router of claim 1, wherein the router comprises a direction register file and logic to determine a direction of a circuit-switched route based on the direction register file, and wherein the configuration logic to select the first mode, including the configuration logic to prevent a write to the direction register file.

4. The router of claim 3, wherein the router comprises an output port and priority logic to select from among a plurality of input ports of the router to provide a packet to the output port, and wherein the configuration logic to prevent the write to the direction register file includes the configuration logic to disable the priority logic or to switchedly decouple the priority logic from the direction register file.

5. The router of claim 1, wherein the router to concurrently perform packet-switched routing of the sideband data and circuit-switched routing of other data.

6. The router of claim 1, the first input portion further to receive a second packet from the other router, the second packet including second control information;

wherein the evaluation logic to perform an evaluation of the second control information and, wherein the configuration logic to perform, based on the evaluation of the second control information, a selection from among:

the first mode to route the second packet to communicate second packet-switched sideband data from the router; and the second mode to configure a second circuit-switched channel according to the second packet.

7. The router of claim 1, wherein, for each packet of a sequence of packets received via the first input portion, the evaluation logic to perform a respective evaluation of the packet, and the evaluation logic to perform a selection between the first mode and the second mode based on the respective evaluation.

8. The router of claim 1, wherein the router to operate as a node of a hierarchical network.

9. The router of claim 8, wherein a hierarchy of the hierarchical network includes:

a level N comprising the router; and a level N−1 lower than level N in the hierarchy, the level N−1 comprising a plurality of nodes each to communicate with the level N via the router, wherein the router is positioned at a middle of an arrangement of the plurality of nodes.

10. The router of claim 8, wherein a hierarchy of the hierarchical network includes:

a lowest level of the hierarchy including a first node and a second lowest level of the hierarchy including a second node coupled to the first node via a channel, and wherein, for each of a plurality of repeaters of the hierarchical network, a distance of the repeater from a respective adjacent node of the network is equal to a length of the channel.

11. The router of claim 8, further comprising:

determining a value k corresponding to a level of the router in a hierarchy of the hierarchical network;

based on the value k, evaluating a destination address of the packet to determine a direction of a packet-switched routing of the packet, the destination address including a first address value comprising a total of n bits, the evaluating including performing comparisons based on only (n−k) bits of the first address value.

12. A method at an integrated circuit, the method comprising:

receiving a first packet at a first input port of a first router, the first packet including control information, wherein the first packet is received from a second router via a first input portion of the first input port;

receiving first data from the second router via a second input portion of the first input port;

performing an evaluation of the control information, including evaluating a sideband enable signal of the first packet and evaluating a data valid signal of the first packet; and based on the evaluation of both the sideband enable signal and the data valid signal, performing a selection from among:

a first mode of the first router to route the first packet to communicate packet-switched sideband data from the first router; and a second mode of the first router to configure a circuit-switched channel according to the first packet, the circuit-switched channel for communication of the first data between a source node of a network and a destination node of the network.

13. The method of claim 12, wherein evaluating the sideband enable signal includes evaluating a Boolean AND of the sideband enable signal and the data valid signal.

14. The method of claim 12, wherein the first router comprises a direction register file and logic to determine a direction of a circuit-switched route based on the direction register file, the method further comprising:

based on a selection of the first mode, preventing a write to the direction register file.

15. The method of claim 14, wherein the first router comprises an output port and priority logic to select from among a plurality of input ports of the first router to provide a packet to the output port, and wherein preventing the write to the direction register file includes disabling the priority logic or switchedly decoupling the priority logic from the direction register file.

16. The method of claim 12, wherein the first router operates as a node of a hierarchical network, the method further comprising:

determining a value k corresponding to a level of the first router in a hierarchy of the hierarchical network; and based on the value k, evaluating a destination address of the packet to determine a direction of a packet-switched routing of the packet, the destination address including a first address value comprising a total of n bits, the evaluating including performing comparisons based on only (n−k) bits of the first address value.

17. An integrated circuit die including a plurality of routers coupled with one another in a network, the plurality of routers including a first router and a second router, a first router comprising:

a first input port including:

a first input portion to receive a first packet from the second router, the first packet including control information; and a second input portion to receive first data from the second router;

wherein the first router includes:

evaluation logic to perform an evaluation of the control information, including the evaluation logic to evaluate a sideband enable signal of the first packet and to evaluate a data valid signal of the first packet; and configuration logic to perform, based on the evaluation of both the sideband enable signal and the data valid signal, a selection from among:

a first mode of the first router to route the first packet to communicate packet-switched sideband data from the first router; and a second mode of the first router to configure a circuit-switched channel according to the first packet, the circuit-switched channel for communication of the first data between a source node and a destination node.

18. The integrated circuit die of claim 17, wherein the first router comprises a direction register file and logic to determine a direction of a circuit-switched route based on the direction register file, and wherein the configuration logic to select the first mode, including the configuration logic to prevent a write to the direction register file.

19. The integrated circuit die of claim 17, wherein the first router to concurrently perform packet-switched routing of the sideband data and circuit-switched routing of other data.

20. A router including:

a first input port to receive from another router a first packet including a destination address, wherein a first address value of the destination address comprises a total of n bits;

direction logic comprising circuitry configured to determine a value k corresponding to a level of the router in a hierarchy of a hierarchical network, wherein based on the value k, the direction logic further to evaluate the destination address to determine a direction of a packet-switched route for the first packet, including the direction logic to perform comparisons based on the first address value, wherein, of the n bits of the first address value, the comparisons are based on only (n−k) bits; and an output port to send the first packet from the router, wherein the first packet is routed in the hierarchical network according to the direction of the packet-switched route.

21. The integrated circuit router of claim 20, wherein the hierarchy includes:

a level N comprising the router; and a level N−1 lower than level N in the hierarchy, the level N−1 comprising a plurality of nodes each to communicate with the level N via the router, wherein the router is positioned at a middle of an arrangement of the plurality of nodes.

22. The router of claim 20, wherein a lowest level of the hierarchy includes a first node and a second lowest level of the hierarchy includes a second node coupled to the first node via a channel, and wherein, for a plurality of repeaters of the hierarchical network, a distance of the repeater from a respective adjacent node of the network is equal to a length of the channel.

* * * * *